US006516042B2

(12) United States Patent
Helmersson

(10) Patent No.: US 6,516,042 B2
(45) Date of Patent: *Feb. 4, 2003

(54) NUCLEAR FUEL ASSEMBLY

(75) Inventor: Sture Helmersson, Kolbäck (SE)

(73) Assignee: Westinghouse Atom AB, Vasteras (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/202,639

(22) PCT Filed: May 30, 1997

(86) PCT No.: PCT/SE97/00932

§ 371 (c)(1),
(2), (4) Date: Feb. 5, 1999

(87) PCT Pub. No.: WO97/49096

PCT Pub. Date: Dec. 24, 1997

(65) Prior Publication Data

US 2001/0003537 A1 Jun. 14, 2001

(30) Foreign Application Priority Data

Jun. 20, 1996 (SE) ................................................ 9602447

(51) Int. Cl.$^7$ .............................................. G21C 3/322
(52) U.S. Cl. .................... 376/433; 376/434; 376/435; 376/439; 376/443; 376/444; 376/448; 376/352
(58) Field of Search ................................. 376/433, 434, 376/435, 439, 443, 444, 448, 352

(56) References Cited

U.S. PATENT DOCUMENTS

| | | | | |
|---|---|---|---|---|
| 3,087,882 A | * | 4/1963 | Martin | |
| 3,658,646 A | * | 4/1972 | Mueller | ........................ 176/78 |
| 3,663,365 A | * | 5/1972 | Pettinger et al. | ............. 376/433 |
| 3,941,654 A | * | 3/1976 | Tarasuk et al. | |
| 4,134,791 A | * | 1/1979 | Delafosse | ...................... 176/75 |
| 4,478,786 A | * | 10/1984 | Andersson et al. | .......... 376/444 |
| 4,795,608 A | * | 1/1989 | Nylund | ......................... 376/444 |
| 4,913,876 A | * | 4/1990 | Lettau et al. | ................. 376/444 |
| 4,957,698 A | * | 9/1990 | Ritter | ........................... 376/444 |
| 4,968,479 A | * | 11/1990 | Ogiya et al. | .................. 376/428 |
| 5,017,332 A | * | 5/1991 | Dix et al. | ..................... 376/370 |
| 5,068,082 A | * | 11/1991 | Ueda et al. | ................... 376/428 |

(List continued on next page.)

FOREIGN PATENT DOCUMENTS

| | | | | | |
|---|---|---|---|---|---|
| DE | 2204168 | * | 8/1973 | ............. | G21C/3/32 |
| DE | 2 204 168 | | 8/1973 | | |
| DE | 004117623 A | * | 2/1993 | | |
| EP | 0 275 873 A1 | | 7/1988 | | |
| EP | 0 308 701 A1 | | 3/1989 | | |
| EP | 0514117 A1 | * | 11/1992 | ............ | G21C/3/332 |
| EP | 0 514 117 A1 | | 11/1992 | | |
| EP | 0 605 816 A2 | | 7/1994 | | |
| FR | 2603416 A | * | 3/1988 | ............. | G21C/3/32 |
| JP | 54000191 | * | 1/1979 | ............. | G21C/3/32 |
| WO | WO 96/20483 | * | 7/1996 | ............. | G21C/3/30 |

*Primary Examiner*—Michael J. Carone
*Assistant Examiner*—John Richardson
(74) *Attorney, Agent, or Firm*—Connolly Bove Lodge & Hutz, LLP; Larry J. Hume

(57) ABSTRACT

The invention relates to a fuel assembly for a boiling water reactor which is adapted, during operation of the reactor, to allow water to flow upwards through the fuel assembly while absorbing heat from a plurality of fuel rods, whereby part of the water is transformed into steam. The fuel assembly comprises a steam channel through which the steam flows through the fuel assembly. The steam channel (16a, 16b, 16c, 16d) consists of an empty volume which at least extends through part of the fuel assembly. The fuel assembly is designed such that the water and the steam are brought to rotate around the steam channel whereby the water is thrown away from the steam channel whereas the steam which is separated from the water flows upwards through the steam channel.

7 Claims, 5 Drawing Sheets

U.S. PATENT DOCUMENTS

| | | | | |
|---|---|---|---|---|
| 5,091,146 A | * | 2/1992 | Dix | 376/443 |
| 5,112,570 A | * | 5/1992 | Dix et al. | 376/370 |
| 5,112,571 A | * | 5/1992 | Orii et al. | 376/439 |
| 5,116,567 A | * | 5/1992 | Fennern | 376/433 |
| 5,162,097 A | * | 11/1992 | Fennern | |
| 5,229,068 A | * | 7/1993 | Johansson et al. | 376/371 |
| 5,245,643 A | * | 9/1993 | Dix et al. | 376/371 |
| 5,255,300 A | * | 10/1993 | Patterson et al. | 376/423 |
| 5,375,153 A | * | 12/1994 | Patterson et al. | 376/435 |
| 5,416,812 A | * | 5/1995 | Matzner | 376/371 |
| 5,572,560 A | * | 11/1996 | Brown | 376/435 |
| 5,724,398 A | * | 3/1998 | Burrow et al. | |
| 5,859,886 A | * | 1/1999 | Nylund | 376/434 |
| 6,236,701 B1 | * | 5/2001 | Nylund | 376/443 |

* cited by examiner

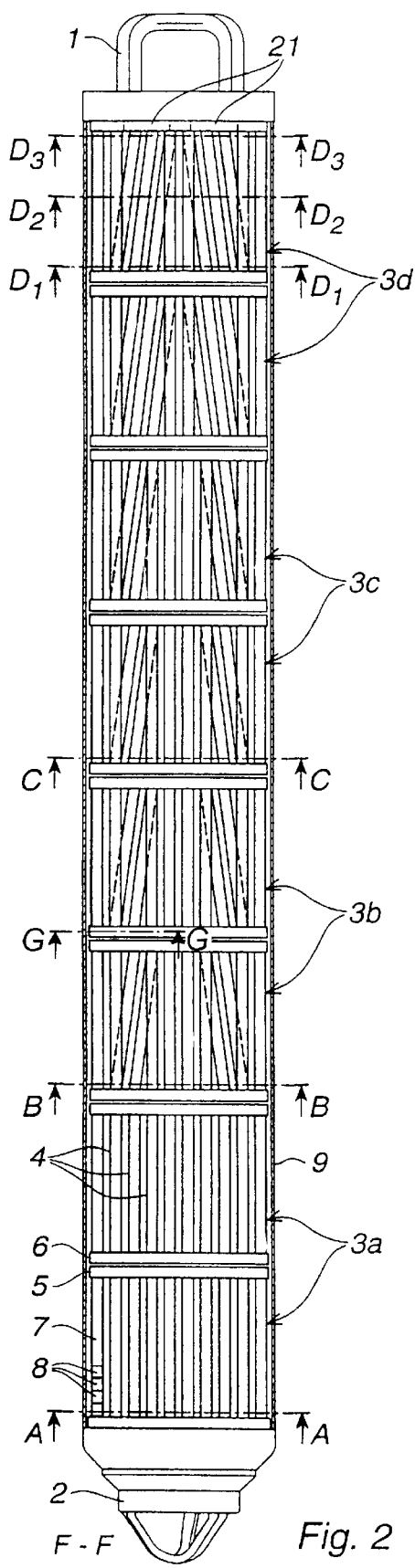
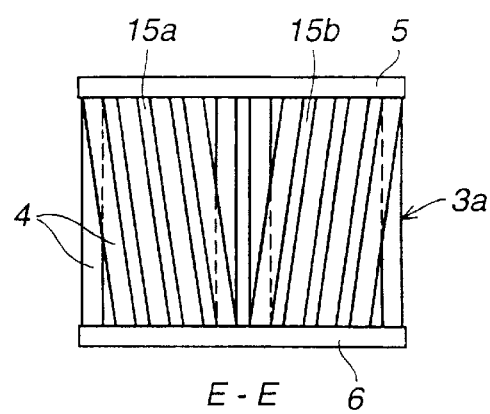
E - E
Fig. 4
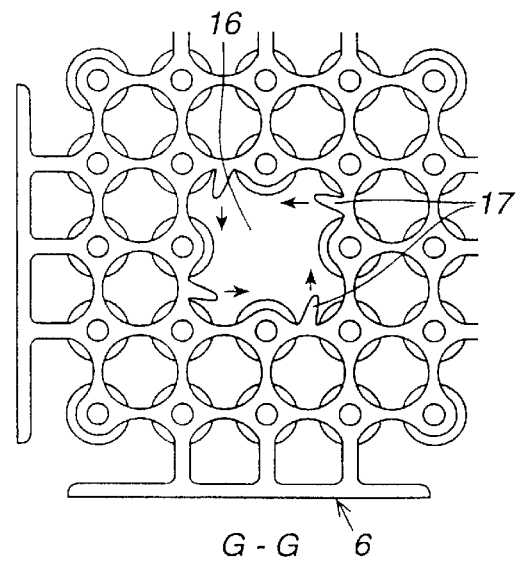
G - G
Fig. 5
Fig. 2
F - F

A - A

B - B $D_2 - D_2$ $D_3 - D_3$

NUCLEAR FUEL ASSEMBLY

FIELD OF THE INVENTION

The present invention relates to a fuel assembly for a boiling water reactor which is adapted, during operation of the reactor, to allow cooling water to flow upwards through the fuel assembly while absorbing heat from a plurality of fuel rods which are surrounded by a fuel channel, whereby part of the cooling water is transformed into steam, and wherein the fuel assembly comprises a steam channel through which the steam is allowed to flow through the fuel assembly towards the outlet end thereof.

BACKGROUND OF THE INVENTION

In a boiling water reactor, moderated by means of light water, the fuel exists in the form of fuel rods, each of which contains a stack of pellets of a nuclear fuel arranged in a cladding tube. A fuel bundle comprises a plurality of fuel rods arranged in parallel with each other in a certain definite, normally symmetrical pattern, a so-called lattice, and is retained at the top by a top tie plate and at the bottom by a bottom tie plate. A fuel assembly comprises one or more fuel bundles, each one extending along the main part of the length of the fuel assembly and being surrounded by a substantially square fuel channel.

The core is immersed into water which serves both as coolant and as neutron moderator. The fuel assemblies are arranged vertically in the core and spaced from each other. During operation, the water is admitted through the bottom of the fuel assembly and then flows upwards through the fuel assembly past the fuel rods. The heat given off by the fuel rods is taken up by the water which starts boiling, whereby part of the water is transformed into steam. The water and the steam are passed out through the upper end of the fuel assembly. The produced steam is delivered to turbines which drive generators where electrical energy is generated.

A disadvantage with a boiling water reactor is the high percentage of steam in the upper part of the fuel assembly. When the percentage of steam rises in the coolant, its capacity to conduct heat away from the fuel rods is reduced, whereby the risk of dryout increases, which in turn leads to an increased risk of fuel damage. An additional problem with a high steam content in the fuel is that steam is much inferior to water as moderator, which has the consequence that the moderation becomes insufficient whereby the fuel is utilized inefficiently. In the lower part of the fuel assembly, the moderator consists of water whereas the moderator at the upper part of the fuel assembly consists of both steam and water. This means that the fuel in the upper part of the fuel assembly is not utilized efficiently. For this reason, it is desirable to reduce the steam content in the coolant while at the same time maintaining the steam generation at a high level.

The percentage by volume of steam a is a very important parameter for the nuclear properties of the fuel and the core. If the water phase and the steam phase both move at the same velocity, a may be directly determined from the mixing equation:

$$\alpha = \frac{1}{1 + \frac{1-x}{x} \cdot \frac{\rho_g}{\rho_l}} \quad (1)$$

x=the percentage by weight of steam which is given by the supplied thermal energy $\rho_g$=the density of the steam phase
$\rho_l$=the density of the liquid phase the quotient $$\frac{\rho_g}{\rho_l}$$

is about 0.05 for normal operating conditions in a boiling reactor at a pressure of about 7 MPa. The relationship between α and x is illustrated in FIG. 1.

If the steam phase and the liquid phase move at different velocities, this can be described with the following modification of equation 1:

$$\alpha = \frac{1}{1 + S \cdot \frac{1-x}{x} \cdot \frac{\rho_g}{\rho_l}} \quad (2)$$

where S (the grinding factor i.e. slip factor) describes the velocity ratio between the phases, such as S>1 means that the steam flows more rapidly than the liquid. S is actually a complicated function of the percentage by weight of steam, pressure, geometry, etc. It is well-known, however, that in a boiling reactor, a higher steam velocity is naturally obtained towards the outlet, which is due to the considerably lower density of the steam. If the steam flow has a higher velocity than the water flow, the percentage by volume of steam in the fuel assembly decreases. The real percentage by volume of steam is therefore 5–10% below that which could be expected without any velocity difference between the phases, at least in the upper part of the fuel assembly where the percentage by weight of steam is above 40%.

The conclusion of the above reasoning is that the faster the steam disappears from the fuel assembly, the lower will be the percentage by volume of steam. A separation of the steam flow and the water flow in the upper part of the fuel assembly thus gives the steam flow a higher velocity than the water flow, whereby the percentage of steam by volume in the fuel assembly decreases. In this way, the margin with respect to dryout is improved and the fuel in the upper part of the fuel assembly is utilized in a better way.

The patent specification of U.S. Pat. No. 5,091,146 shows a fuel assembly which attempts to achieve a separation of the steam flow and the water flow in the upper part of the fuel assembly by arranging a steam vent tube above one or more part-length fuel rods, that is, fuel rods extending from the bottom tie plate but terminating below and spaced from the top tie plate. In this way, the steam which is generated in the coolant is to be discharged. The tube has openings both in its upper and lower ends. The disadvantages of such a tube are several. For one thing, it is expensive to manufacture and, for another, it provides increased pressure drop in the fuel assembly. Another disadvantage is that it may be difficult to cause the continuously produced steam to enter the tube. Admittedly, the tube is provided with openings and other devices to encourage steam to flow into the tube and prevent water from entering the tube, but it is still doubtful whether this is an efficient way of causing the steam to enter the tube.

SUMMARY OF THE INVENTION

The invention aims to provide a fuel assembly which in a simple and efficient way separates the steam flow and the water flow at least partially, thus obtaining a lower percentage by volume of steam in the fuel assembly.

What characterizes a fuel assembly according to the invention will become clear from the discussion below.

A fuel assembly according to the invention comprises a vertical channel which conducts steam upwards through the fuel assembly during operation of the reactor. This channel has no walls but consists of only an empty volume between the fuel rods and will hereinafter be referred to as a steam channel.

The fuel assembly is designed such that the coolant, that is, water and steam, is brought to rotate around the steam channel so as to form an upwardly extending eddy. The eddy rotates so quickly that the steam is separated from the water with the aid of the centrifugal force. The water, which is heavier than the steam, is thrown outwards and away from the steam channel, whereas the lighter steam is pressed against the center of the eddy and hence against the steam channel. This gives the steam a considerably higher velocity than the natural one and allows the steam to leave the fuel assembly via the steam channel at a high velocity. In this way, the percentage by volume of steam in the fuel assembly is reduced.

The transport of steam to the center of the eddy intensifies the rotation since the moment of inertia decreases. Since the steam disappears out from the fuel assembly at a higher velocity than the water, the percentage by volume of steam in the coolant is reduced, which improves the cooling of the fuel. Also, a partial separation of water and steam is valuable. In practice, the first few percentage of reduction of the steam volume provides the greatest yield.

The invention affords a plurality of advantages. Most of them originate from the reduced percentage by volume of steam. The cooling is improved and hence the margin with respect to dry-out increases. A smaller amount of steam increases the reactivity whereby the need of enriching the fuel is reduced. The shutdown margin is improved since less reactivity is bound in the steam. A reduced variation in the axial percentage by volume of steam and the reduced number of fuel rods upwards in the bundle make it possible to achieve an essentially optimum water/uranium ratio along the whole length of the assembly, which increases the reactivity further. The more open lattice and the smaller percentage by volume of steam provide a lower pressure drop. Less reactivity bound in the steam leads to less negative reactivity coefficients. The stability of the core and several different transients are improved.

Still another advantage is the improved shutdown margin, which is a consequence of the upper part of the fuel containing at least one coherent region without fuel rods. During shutdown, these are water-filled and contribute to considerably reduce the reactivity and hence improve the shutdown margin.

BRIEF DESCRIPTION OF THE DRAWINGS

FIG. 2 schematically shows a vertical section through an embodiment of a fuel assembly according to the invention.

FIG. 4 shows a fuel unit in the upper part of the fuel assembly in a view from the side.

FIG. 5 shows part of the bottom tie plate of a fuel unit.

DESCRIPTION OF THE PREFERRED EMBODIMENTS

Figure 1:
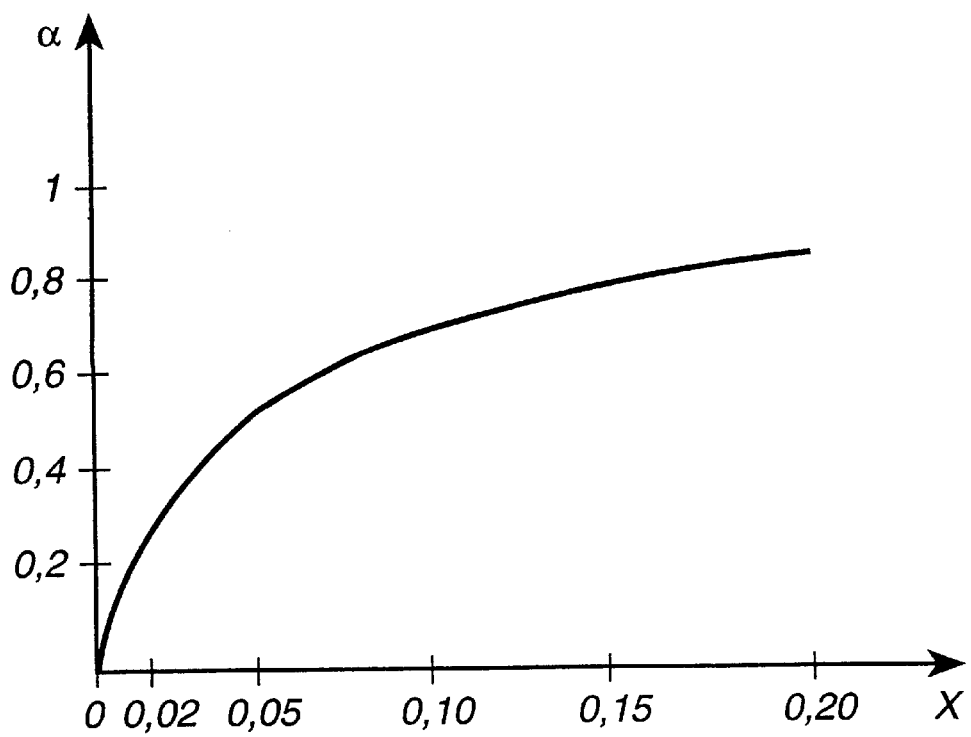
FIG. 1 represents a graph showing the ratio between the percentage by volume of steam α and the percentage by weight of steam x.

To be able to design the fuel assembly such that water and steam are separated in an efficient way, it is desirable for the fuel assembly to be so flexible that it may be given different shapes in the axial direction in a simple manner. Such a fuel assembly is shown in international patent document PCT/SE95/01478 publication number WO 96/20483. This fuel assembly comprises a plurality of fuel units stacked one above the other, each one comprising a plurality of fuel rods extending between a top tie plate and a bottom tie plate. The fuel units are surrounded by a common fuel channel with a substantially square cross section. A fuel assembly of this type may given different shapes in the axial direction in a simple manner.

FIGS. 2 and 3a–3f show a fuel assembly according to the invention. During operation, the fuel assembly is arranged vertically in the reactor core. FIG. 2 is a vertical section F—F through the fuel assembly. FIGS. 3a–3f show a number of horizontal sections A—A, B—B, C—C, $D_1$—$D_1$, $D_2$—$D_2$, $D_3$—$D_3$ through the fuel assembly. The fuel assembly comprises an upper handle 1, a lower end portion 2 and a plurality of fuel units 3a, 3b, 3c and 3d stacked one above the other. Each fuel unit comprises a plurality of fuel rods 4 arranged between a top tie plate 5 and a bottom tie plate 6. The fuel units are stacked on top of each other in the longitudinal direction of the fuel assembly and they are stacked in such a way that the top tie plate 5 in one fuel unit is facing the bottom tie plate 6 in the next fuel unit in the stack. A fuel rod 4 comprises fuel in the form of a column of uranium pellets 8 arranged in a cladding tube 7. The fuel assembly is enclosed in a fuel channel 9 with a substantially square cross section. In this embodiment, the fuel assembly contains eight fuel units which are each about 0.5 meters high.

A fuel unit has 100 fuel rod positions in an orthogonal 10×10 lattice. A fuel rod position is a position in the lattice and in these it is possible to arrange a fuel assembly, but all the positions in the lattice need not be occupied by fuel rods. The fuel unit is divided into four sub-bundles with 25 fuel rod positions in an orthogonal 5×5 lattice. The lattice in one sub-bundle comprises a fuel rod position in the center of the sub-bundle, and around this an inner square ring is arranged consisting of 8 fuel rod positions. Outside the inner ring there is an outer square ring consisting of 16 fuel rod positions.

The fuel rods in the fuel unit have an upper end arranged at the top tie plate and a lower end arranged at the bottom tie plate. A fuel rod belonging to the inner or the outer ring has its lower end arranged in a first fuel rod position and its upper end arranged in a second fuel rod position. The upper and lower ends of the fuel rod are thus arranged in separate fuel rod positions. The first and second fuel rod positions are positioned side-by-side and, in addition, belong to the same ring. There are two positions in the lattice which fulfil both of these conditions. The fuel rods are thus inclined between the bottom tie plate and the top tie plate, and a fuel rod may be inclined in two different directions within the same ring. In a sub-bundle all the fuel rods in the two rings are inclined in the same direction, that is, either clockwise or counterclockwise around the center of the sub-bundle.

The purpose of inclining the fuel rods around the center of the sub-bundle is to set the water and the steam, flowing upwards through the fuel assembly, in rotation, thus achieving an eddy with a center in the center of the sub-bundle. The eddy may be directed in the clockwise or counterclockwise direction depending on in which direction the fuel rods in the two rings are inclined. The angle between the longitudinal axis of the fuel assembly and the longitudinal axis of the inclined fuel rods is determined by the distance between the bottom tie plate and the top tie plate and the distance between two fuel rod positions close to each other in the lattice.

Figure 3A:
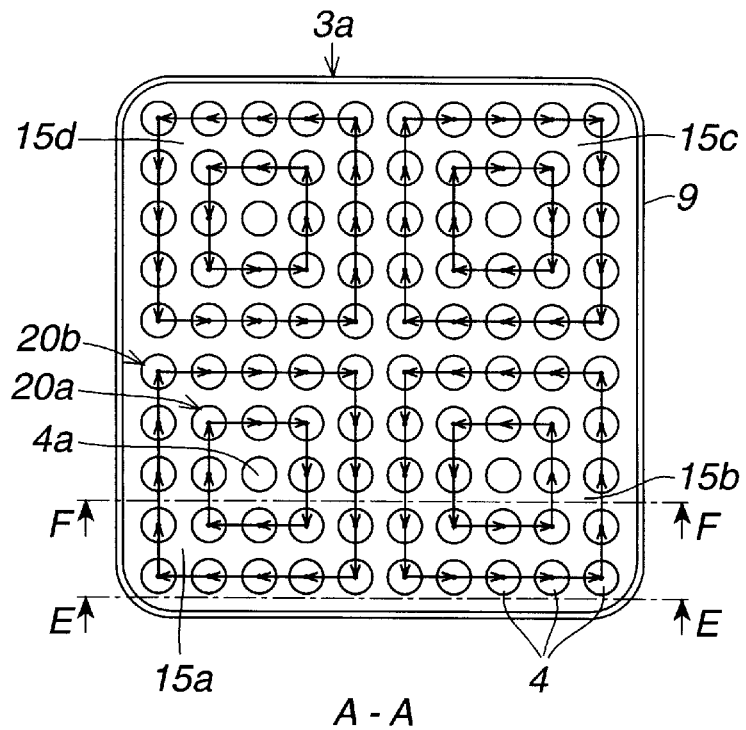
FIGS. 3a–3f show a number of horizontal sections through the fuel assembly in FIG. 2.

The fuel assembly comprises four different types of fuel units 3a, 3b, 3c, 3d. The two lowermost fuel units 3a are identical and a horizontal section A—A through these is shown in FIG. 3a. The fuel unit 3a has 100 fuel rods arranged in a 10×10 lattice, and is divided into four sub-bundles 15a, 15b, 15c, 15d with 25 fuel rods in each sub-bundle. All the fuel rod positions in the lattice are occupied by fuel rods. In the fuel rod position in the center of each sub-bundle, a straight center rod 4a is arranged. The center rod is parallel to the longitudinal axis of the fuel assembly and has the same fuel rod position in both its upper and lower ends. The figure shows by means of arrows in which direction the fuel rods in the inner ring 20a and the outer ring 20b are inclined. In two of the sub-bundles 15a, 15c the fuel rods in the rings are inclined clockwise around the center rod and in the other two sub-bundles 15, 15d the fuel rods in the rings are inclined counterclockwise around the center rod.

FIG. 4 shows the fuel unit 3a in a view from the side in a section E—E through the fuel assembly. The figure shows that the fuel rods in the sub-bundle 15a are inclined to the right and that the fuel rods in the sub-bundle 15b are inclined to the left. By inclining the fuel rods in different directions in the different sub-bundles, four eddies are achieved in the fuel assembly during operation of the reactor, two being directed counterclockwise and two being directed clockwise. The sub-bundles which are arranged along the same diagonal have fuel rods which are inclined in the same direction. It is an advantage if some of the eddies are directed counterclockwise and some are directed clockwise, because in that case the rotational effects which arise—both mechanical and thermohydraulic—may counterbalance each other.

Figure 3B:
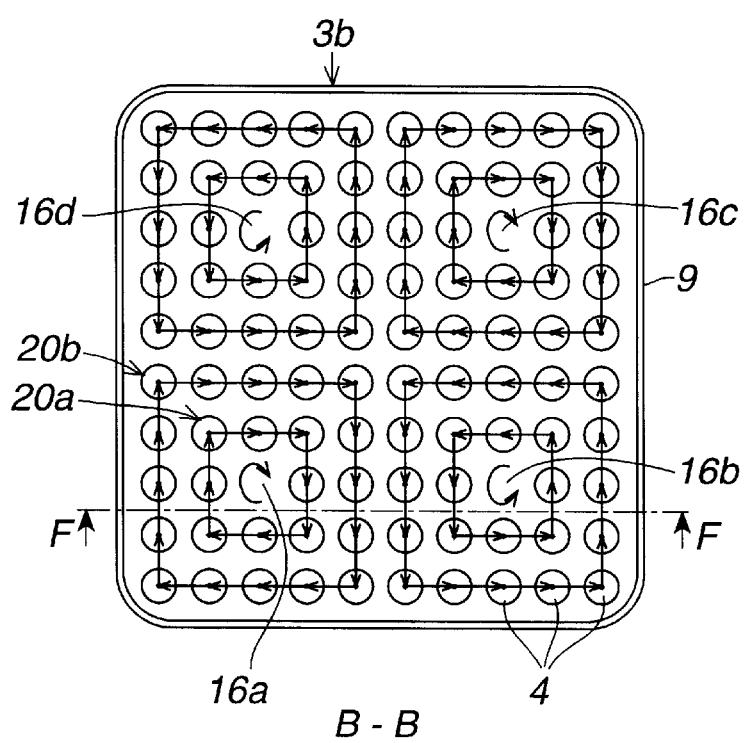

The following two fuel units 3b in the stack are of the same type and a horizontal section B—B through these is shown in FIG. 3b. The fuel unit 3b has 96 fuel rods divided into four sub-bundles. Each one of the sub-bundles contains 24 fuel rods arranged in an inner ring 20a and an outer ring 20b. The fuel rod position in the center of the sub-bundle is unoccupied. In this way, an empty volume is formed in the center of the fuel bundle. Otherwise, the fuel unit 3b is arranged in the same way as the fuel unit 3a. The empty volume constitutes the lower part of a vertical steam channel which extends through the six uppermost fuel units in the fuel assembly. In the two lowermost fuel units 3a, no steam channels are needed since there is no steam there, but on the other hand it is an advantage to initiate the eddy formation at this early stage.

There are four steam channels 16a, 16b, 16c, 16d in the fuel assembly, one in each sub-bundle. The inclined fuel rods in the sub-bundle achieve an eddy of water and steam around the steam channel. The directions of the eddies are marked with arrows in the steam channel. In these eddies, the water and the steam are separated from each other by throwing the water outwards and, hence, away from the steam channel whereas the steam is pressed against the center of the eddy. Because of the low density of the steam and the low flow resistance in the steam channel, the steam will flow upwards at great speed through the steam channel and disappear out through the top of the fuel assembly. In this way, the percentage by volume of steam in the coolant is reduced.

Figure 3C:
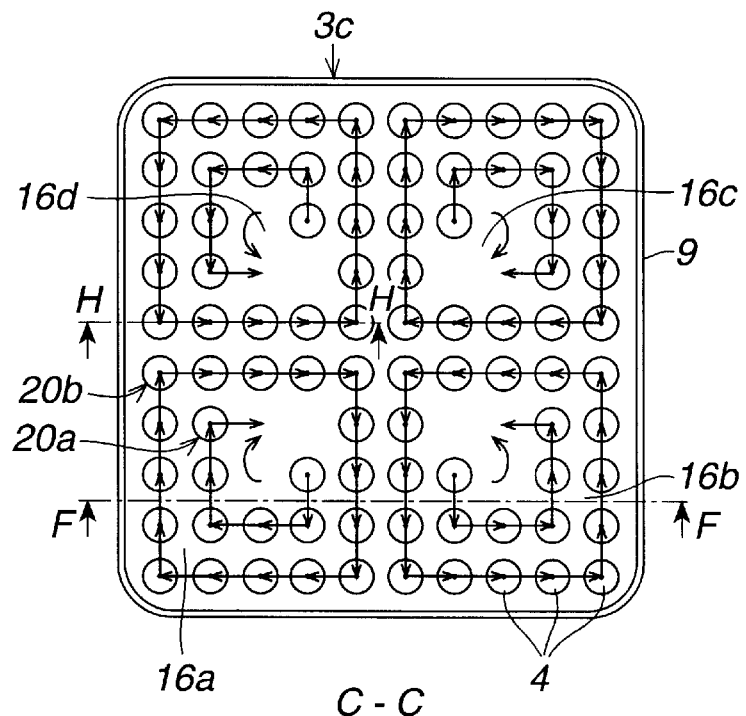

On top of the fuel units 3b in the stack, two fuel units 3c are stacked. A horizontal section C—C through these is shown in FIG. 3c. The fuel unit 3c has 88 fuel rods and each sub-bundle contains 22 fuel rods. In one sub-bundle, the fuel rod position in the center is unoccupied and, in addition, two positions in the inner ring are unoccupied. Otherwise, the fuel unit 3c is arranged in the same way as the fuel unit 3a. By increasing the number of unoccupied fuel rod positions, the steam channels 16a, 16b, 16c, 16d will have a larger cross-section area in these fuel units compared with the fuel units 3b further down in the fuel assembly. In this way, the steam channel will have an increasing cross-section area towards the top of the fuel assembly and hence an increasing volume, which is necessary since the percentage of steam which is to be transported away increases towards the top of the fuel assembly.

Figure 3D:
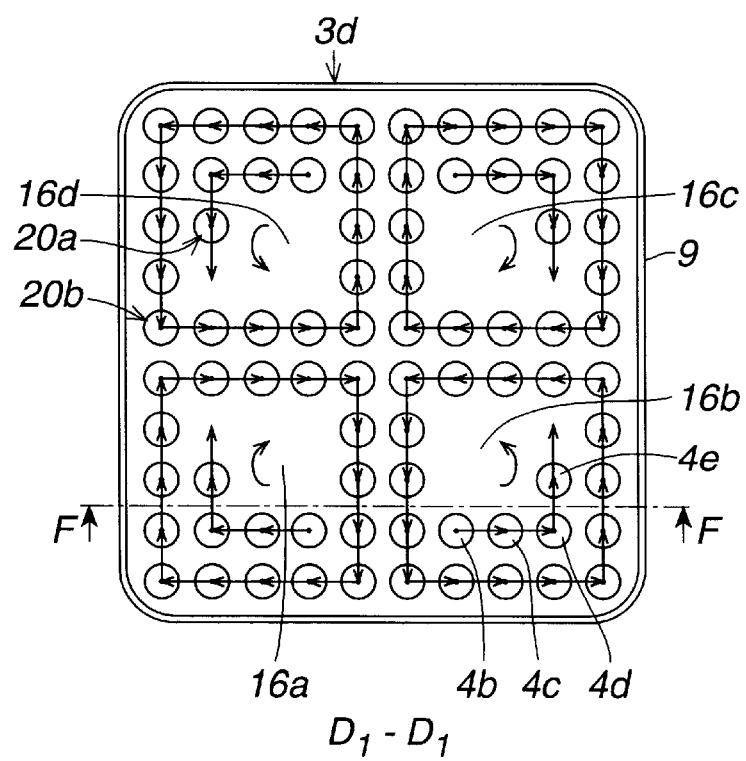

At the top of the fuel assembly, two fuel units 3d are stacked on top of each other. A horizontal section $D_1$—$D_1$ through the fuel unit 3d immediately above the bottom tie plate is shown in FIG. 3d. The fuel unit 3d has 80 fuel rods and each sub-bundle contains 20 fuel rods. In one sub-bundle the fuel rod position in the center and four positions in the inner ring are unoccupied. The unoccupied fuel rod positions are those which are closest to the center of the fuel unit. Otherwise, the fuel unit 3d is arranged in the same way as the fuel unit 3a. The steam channels 16a, 16b, 16c, 16d have their largest cross-section area in these two uppermost fuel units. The steam channels have their outlets 21 through holes in the top tie plate in the uppermost fuel unit in the stack.

Figure 3E:
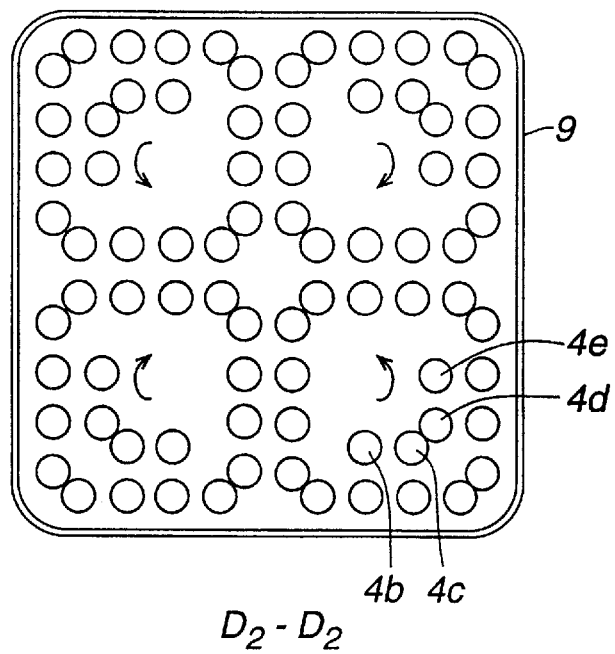
Figure 3F:
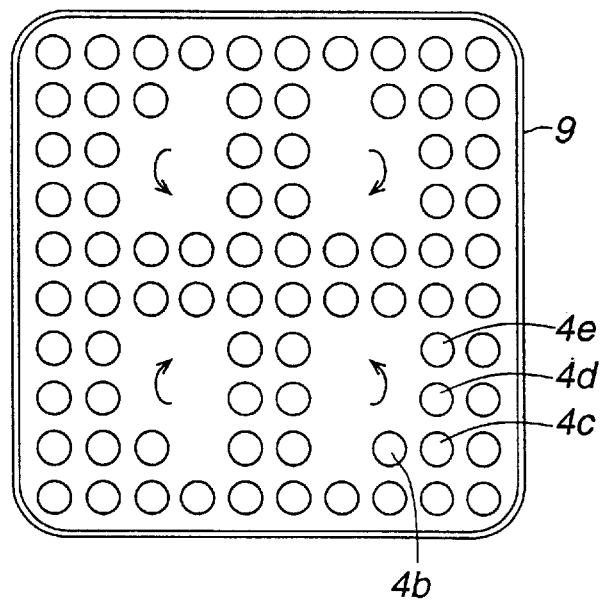

To illustrate how the lattice positions of the fuel rods are displaced between the top tie plate and the bottom tie plate, FIG. 3e shows a horizontal section $D_2$—$D_2$ through the fuel unit 3d on half its height. In FIG. 3f a horizontal section $D_3$—$D_3$ through the fuel unit immediately below the top tie plate is shown. A fuel rod displaces its lattice position one step in the clockwise or the counterclockwise direction within the ring to which it is associated. It is especially shown how the fuel rods 4b, 4c, 4d, 4e in the inner ring are displaced to the next lattice position one step in the counterclockwise direction in the inner ring.

The embodiment described so far is based on an orthogonal lattice with top tie plates and bottom tie plates identical as regards lattice positions. However, the invention may very well be applied also if the lattice is irregular and nor do the lattice positions need to be identical in the top tie plates and the bottom tie plates. The fuel rods may also be inclined to differing degrees in the same fuel unit. Such embodiments may be preferable, for example for increasing the distance between fuel rods which change their direction of inclination in the corners.

The bottom tie plate and the top tie plate may be provided with enlarged holes 16 to allow the passage of the steam in the steam channel. To intensify the eddies around the steam channel, both the bottom tie plate and the top tie plate may be provided with fins around these enlarged holes which are oriented such that the eddy is intensified. FIG. 5 shows part of the bottom tie plate for the fuel unit 3b in a section G—G through FIG. 2. Around the hole 16, fins 17 are arranged to control the water and the steam in the direction of the macroscopic eddy. It is important to note the difference between these fins 17 and know fins which are often arranged on spacers in both boiling water and pressurized-water reactors to mix the coolant in a sub-channel between four adjoining rods and hence improve the dryout margin. In these cases the known fins are to be arranged so as to intensify the microscopic eddy.

There are further possibilities of achieving the above-mentioned intensification of the eddy, for example by turning around ligaments in the top tie and bottom tie plates into an inclination of 45° with the horizontal plane. The top tie plate and/or the bottom tie plate may be provided with a frame which, in turn, may carry obliquely positioned fins or folds.

In another embodiment of the invention, all the fuel rods may be straight and the eddies may be achieved by other means, for example fins on the bottom tie plate and the top tie plate. To seal the fuel rods, they are provided at their upper end with a top plug and at their lower end with a bottom plug. These bottom plugs and top plugs may also be provided with fins or other devices to bring about an eddy in the sub-bundle.

What is claimed is:

1. A fuel assembly for a boiling water reactor, wherein during operation, the fuel assembly permits water to flow upwards through the fuel assembly, a portion of the water being transformed into steam, the fuel assembly comprising:

at least one fuel bundle having a plurality of fuel units stacked on top of each other, each fuel unit comprising a top tie plate, a bottom tie plate, and a plurality of fuel rods extending between the top tie plate and the bottom tie plate;

a steam channel comprising an empty volume that extends at least through a portion of the plurality of fuel units, between the bottom tie plate and the top tie plate of each fuel unit forming the steam channel; and first means arranged outside the steam channel including, in one or more of the fuel units, a plurality of fuel rods arranged in a ring around the empty volume, wherein said plurality of fuel rods are each inclined in either a clockwise or a counterclockwise direction around the empty volume, wherein said plurality of inclined fuel rods forces the water and the steam in the plurality of fuel units to rotate around the steam channel; and wherein the water is thrown away from the steam channel, and the steam is separated from the water and flows upwards through the steam channel.

2. The fuel assembly according to claim 1, wherein the steam channel has an increasing cross-sectional area towards an outlet.

3. The fuel assembly according to claim 1, wherein the fuel assembly comprises a plurality of parallel steam channels.

4. A fuel assembly for a boiling water reactor, wherein during operation, the fuel assembly permits water to flow upwards through the fuel assembly, a portion of the water being transformed into steam, the fuel assembly comprising:

at least one fuel bundle having a plurality of fuel units stacked on top of each other, each fuel unit comprising a top tie plate, a bottom tie plate, and a plurality of fuel rods extending between the top tie plate and the bottom tie plate;

a steam channel comprising an empty volume that extends at least through a portion of the plurality of fuel units, between the bottom tie plate and the top tie plate of each fuel unit forming the steam channel; and first means arranged outside the steam channel comprising in at least certain of the fuel units, a majority of the fuel rods which are arranged inclined in relation to a longitudinal direction of the fuel assembly for causing the water and the steam in the plurality of fuel units to rotate around the steam channel, whereby the water is thrown away from the steam channel, whereas the steam is separated from the water and flows upwards through the steam channel, wherein the fuel assembly comprises a plurality of parallel steam channels, and wherein the first means causing the water and the steam in the fuel bundle to rotate around the steam channel causes the water to rotate clockwise around a first steam channel and counterclockwise around a second steam channel.

5. A fuel assembly for a boiling water reactor, wherein during operation, the fuel assembly permits water to flow upwards through the fuel assembly, a portion of the water being transformed into steam, the fuel assembly comprising:

at least one fuel bundle having a plurality of fuel units stacked on top of each other, each fuel unit comprising a top tie plate, a bottom tie plate, and a plurality of fuel rods extending between the top tie plate and the bottom tie plate;

a steam channel comprising an empty volume that extends at least through a portion of the plurality of fuel units, between the bottom tie plate and the top tie plate of each fuel unit forming the steam channel; and first means arranged outside the steam channel comprising in at least certain of the fuel units, a majority of the fuel rods which are arranged inclined in relation to a longitudinal direction of the fuel assembly for causing the water and the steam in the plurality of fuel units to rotate around the steam channel, whereby the water is thrown away from the steam channel, whereas the steam is separated from the water and flows upwards through the steam channel, wherein at least some of the fuel rods comprise second means for intensifying the rotation of water flow around the steam channel.

6. The fuel assembly according to claim 5, wherein the second means for intensifying the rotation comprises ligaments.

7. The fuel assembly according to claim 6, wherein the second means for intensifying the rotation comprises at least one of a top and bottom plug including fins.

* * * * *